United States Patent
Shaffer et al.

(10) Patent No.: US 11,464,165 B2
(45) Date of Patent: Oct. 11, 2022

(54) WALK POWER MOWER WITH SLIDABLE HANDLE GRIP MOVABLE ALONG A CURVED PATH FOR CONTROLLING A VARIABLE SPEED TRACTION DRIVE

(71) Applicant: The Toro Company, Bloomington, MN (US)

(72) Inventors: Chadwick A. Shaffer, Oakdale, MN (US); Todd A. Porter, Rosemount, MN (US); Jeff Weber, Minneapolis, MN (US); Shawn S. Monitor, Robbinsdale, MN (US); Jason Van Putten Holt, Minneapolis, MN (US)

(73) Assignee: THE TORO COMPANY, Bloomington, MN (US)

( * ) Notice: Subject to any disclaimer, the term of this patent is extended or adjusted under 35 U.S.C. 154(b) by 81 days.

(21) Appl. No.: 16/788,863

(22) Filed: Feb. 12, 2020

(65) Prior Publication Data

US 2021/0243949 A1  Aug. 12, 2021

(51) Int. Cl.
*A01D 34/82* (2006.01)
*A01D 34/68* (2006.01)
(Continued)

(52) U.S. Cl.
CPC ....... *A01D 34/824* (2013.01); *A01D 34/6806* (2013.01); *A01D 34/69* (2013.01);
(Continued)

(58) Field of Classification Search
CPC .. A01D 34/824; A01D 34/6806; A01D 34/69; A01D 34/78; A01D 2034/6843; A01D 2101/00
See application file for complete search history.

(56) References Cited

U.S. PATENT DOCUMENTS 3,336,042 A * 8/1967 Southall .................. A01D 34/62
280/47.371
6,082,083 A  7/2000 Stalpes et al.
(Continued)

FOREIGN PATENT DOCUMENTS

CN  109451955  3/2019
GB  1003733  9/1965
(Continued)

OTHER PUBLICATIONS

The Toro Company, "Greensmaster 1000 Operator's Manual", 1994.
International Search Report and Written Opinion for PCT/IB2021/051101 dated May 6, 2021; 9 pages.

*Primary Examiner* — Abigail A Risic
(74) *Attorney, Agent, or Firm* — Mueting Raasch Group

(57) ABSTRACT

A walk power mower has a deck with an upwardly and rearwardly extending handle behind which a use walks when operating the mower. The mower is self-propelled by a variable speed traction drive. The handle includes a slidable handle grip for engaging and selecting a speed of the traction drive to control the ground speed of the mower. Forward ground speed is set by pushing the handle grip forwardly on the handle from a neutral position. Reverse ground speed if available is by pulling the handle grip rearwardly from its neutral position. The handle grip follows a curved path as it moves forwardly or rearwardly to flatten the path of travel of the handle grip from the travel that would have occurred absent the curved path.

21 Claims, 6 Drawing Sheets

(51) Int. Cl.
*A01D 34/69* (2006.01)
*A01D 101/00* (2006.01)
*A01D 34/78* (2006.01)

(52) U.S. Cl.
CPC ...... *A01D 34/78* (2013.01); *A01D 2034/6843* (2013.01); *A01D 2101/00* (2013.01)

(56) References Cited

U.S. PATENT DOCUMENTS

| | | |
|---|---|---|
| 6,848,523 B2 | 2/2005 | Ishikawa et al. |
| 7,401,803 B1 | 7/2008 | Lai |
| 10,039,229 B2 | 8/2018 | Wadzinski et al. |
| 2006/0053763 A1 | 3/2006 | Stover et al. |
| 2015/0240919 A1* | 8/2015 | Barendrecht ......... F16H 63/067 474/37 |
| 2017/0367258 A1 | 12/2017 | Shaffer et al. |
| 2019/0230852 A1* | 8/2019 | Curtis ................. A01D 34/824 |
| 2020/0107497 A1* | 4/2020 | Ferrell ................. A01D 34/67 |

FOREIGN PATENT DOCUMENTS

| | | |
|---|---|---|
| GB | 1326735 | 8/1973 |
| JP | 2002-349597 | 12/2002 |
| WO | 2021161198 | 8/2021 |

\* cited by examiner

WALK POWER MOWER WITH SLIDABLE HANDLE GRIP MOVABLE ALONG A CURVED PATH FOR CONTROLLING A VARIABLE SPEED TRACTION DRIVE

TECHNICAL FIELD

This invention relates to a walk power mower having a variable speed traction drive for self-propelling the mower over the ground at different ground speeds and to a user operable control, namely a slidable handle grip, for controlling the ground speed of the mower.

BACKGROUND OF THE INVENTION

U.S. Pat. No. 6,082,083 to Stalpes et al., owned by The Toro Company, relates to a walk power mower for cutting grass. The mower has a deck that includes a traction drive which self-propels the deck at a variable ground speed during a grass cutting operation. An upwardly and rearwardly extending handle is attached to the deck to allow a user who walks behind the mower to guide the mower while cutting grass. The handle slidably mounts a handle grip that controls the ground speed of the mower in accordance with how far the handle grip is slid downwardly on the handle from a neutral position. Since the distance the handle grip slides downwardly is generally correlated to how fast the user walks, the traction drive self-propels the mower at a ground speed of the mower which generally matches the walking speed of the user. Thus, as the user walks faster or walks slower, the ground speed of the mower as provided by the traction drive similarly increases or decreases generally in concert with the walking pace of the user in a seemingly effortless and natural manner. Such a mower has long been sold by The Toro Company in its Personal Pace® line of walk power mowers.

The traction drive of the mower of Stalpes was unidirectional to self-propel the mower only in the forward direction. In this configuration, the neutral position of the slidable handle grip was an uppermost position of the handle grip on the handle. However, later Personal Pace® mower models of The Toro Company adapted the slidable handle grip to bidirectional traction drives in which the mower was self-propelled in both forward and reverse. Examples of such bidirectional Personal Pace® mowers are taught in U.S. Pat. No. 10,039,229 to Wadzinski et al. and U.S. Pat. No. 10,111,381 to Shaffer et al., both of which are owned by The Toro Company. In this configuration, the neural position of the slidable handle grip is located between an uppermost position and a lowermost position of the handle grip on the handle. Forward motion of the mower is selected by pushing the handle grip downwardly from the neutral position and reverse motion of the mower is selected by pulling the handle grip upwardly from the neutral position.

The slidable handle grip of the mowers described above follows a straight, vertically inclined path during its upward and downward motions. Some users when pulling back on the handle grip, e.g. when reverse direction of a bidirectional mower is desired, may have a tendency to push down on the handle that mounts the handle grip. This lifts the front wheels of the mower off the ground with the front wheels in some mower configurations comprising the very wheels which are attempting to self-propel the mower rearwardly. This causes the mower to lose traction which is obviously a disadvantage. This invention is directed in part to overcoming this disadvantage.

SUMMARY OF THE INVENTION

One aspect of this invention relates to a walk power mower. The mower comprises a deck having at least one rotary cutting blade for cutting grass. The deck has a self-propel system to provide the deck with powered movement over the ground at a variable ground speed. A handle extends from the deck to allow an operator to walk behind the deck and hold the handle and thereby guide the deck during its movement over the ground. The handle includes a handle grip that slides up and down on the handle to control the ground speed of the deck. The slidable handle grip of the handle follows a curved path as it slides up and down on the handle.

Another aspect of this invention relates to a walk power mower. The mower comprises a deck having at least one rotary cutting blade for cutting grass. The deck has a self-propel system to provide the deck with powered movement over the ground at a variable ground speed. A handle extends from the deck to allow an operator to walk behind the deck and hold the handle and thereby guide the deck during its movement over the ground. A pair of laterally spaced handle tubes are connected at lower ends thereof to the deck, the handle tubes being joined to one another at upper ends thereof by a laterally extending cross member. The handle tubes have curved upper portions located between lower portions of the handle tubes and the cross member. A handle grip having a pair of laterally spaced, curved legs is telescopically connected to the curved upper portions of the handle tubes to permit the curved legs of the handle grip to slide up and down on the curved upper portions of the handle tubes to control the ground speed of the deck.

Another aspect of the invention relates to walk power mower. The mower comprises a deck having at least one rotary cutting blade for cutting grass. The deck has a bidirectional self-propel system to provide the deck with powered forward and reverse movement over the ground at a variable ground speed. A handle extends from the deck to allow an operator to walk behind the deck and hold the handle and thereby guide the deck during its movement over the ground. The handle includes a handle grip that slides up and down on the handle to control the ground speed of the deck. The slidable handle grip of the handle follows a curved path as it slides up and down on the handle. The handle grip has a neutral position in which the self-propel system is disengaged, a fully forward position in which the handle grip has been pushed downwardly from the neutral position to propel the deck forwardly at a maximum forward ground speed, and a fully rearward position in which the handle grip has been pulled rearwardly from the neutral position to propel the deck rearwardly a maximum rearward ground speed. The handle grip in the fully rearward position has risen relative to the neutral position by a distance D2 which is approximately 50% or less than a distance D1 corresponding to how far the handle grip in the fully forward position has dropped relative to the neutral position.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

The walk power mower of this invention is a Personal Pace® mower having a handle which incorporates an improved traction drive control of the type taught in the aforementioned U.S. Pat. No. 6,082,083 to Stalpes et al., U.S. Pat. No. 10,039,229 to Wadzinski et al., and U.S. Pat. No. 10,111,381 to Shaffer et al. All of these patents are incorporated by reference as to the variable speed traction drives used in such Personal Pace® mowers. In addition, all of these patents are further incorporated by reference as to the details of the structure of the handle and of the traction drive controls carried thereon, as to how the traction drive controls are connected or coupled to the traction drives, and as to how the movement of the traction drive controls on the mower handle engages and disengages the operation of the traction drives and how such movement selects or sets the speed of the mower over the ground once the traction drive is engaged. However, this incorporation by reference notwithstanding, a brief description of the underlying Personal Pace® mower and of a typical handle taught in the patents incorporated by reference will be set forth below for background purposes.

Figure 1:
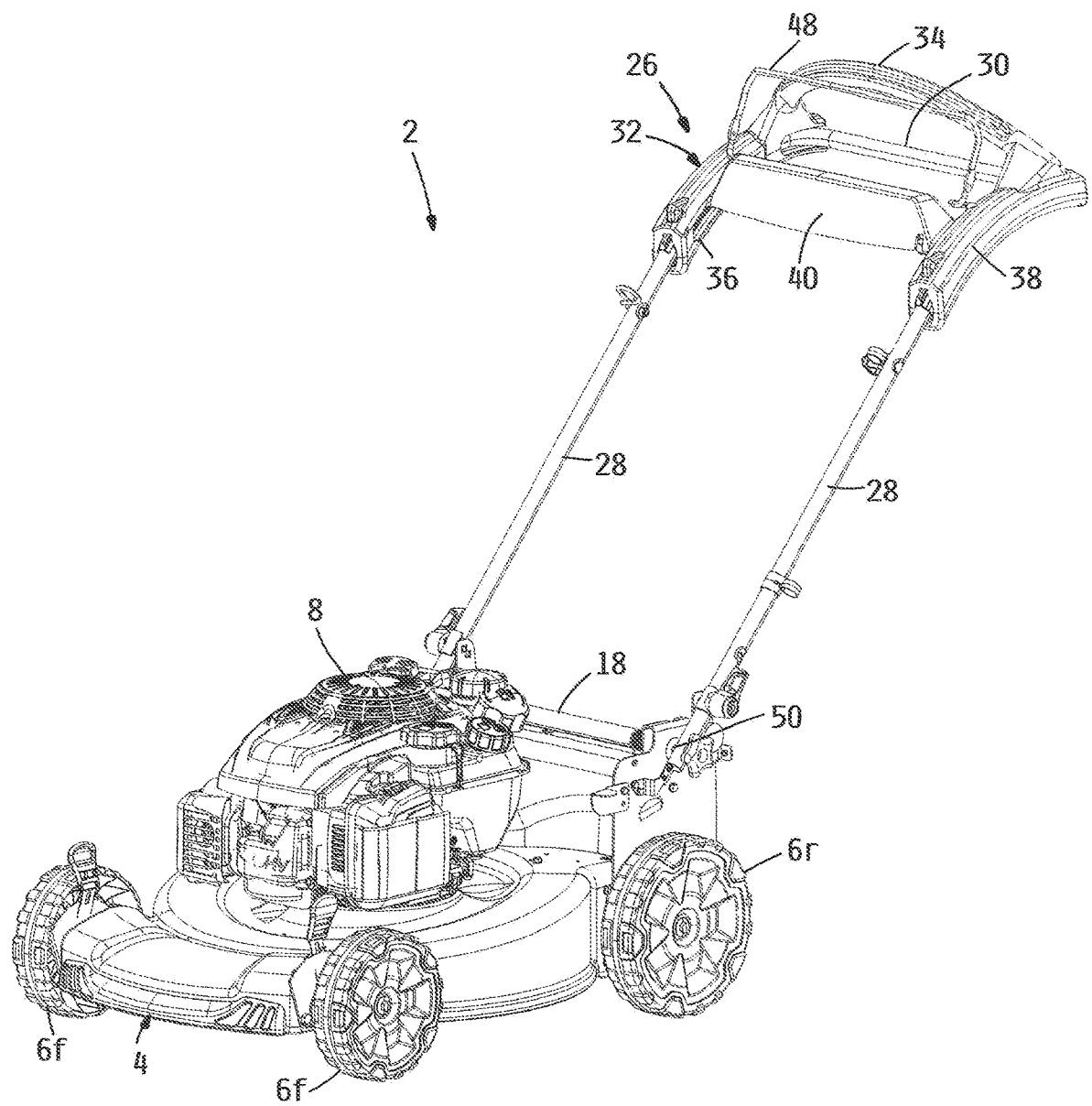
FIG. 1 is a front perspective view of one embodiment of a walk power mower according to this invention.
Figure 2:
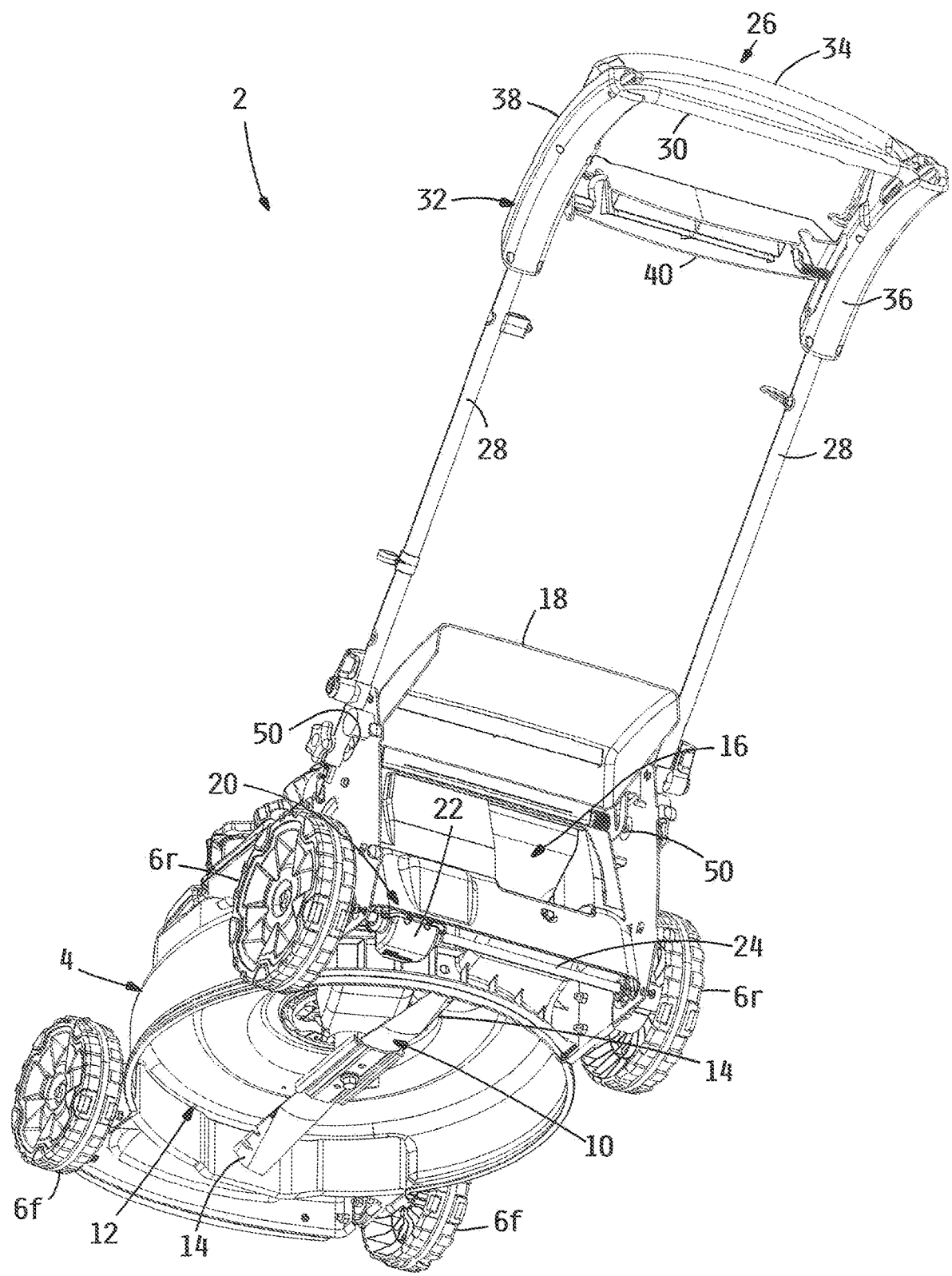
FIG. 2 is a rear perspective view of the mower of FIG. 1.

Accordingly, one embodiment of a mower according to this invention is illustrated in FIGS. 1 and 2 generally as 2. Mower 2 has a housing or deck 4 supported for movement over the ground by a plurality of wheels 6. Preferably, there are four wheels 6 comprising a pair of front wheels 6f and a pair of rear wheels 6r arranged generally at or adjacent the corners of the deck. Other numbers, arrangements and/or placements of wheels 6 could be used. A full width rear roller could also be used in place of rear wheels 6r.

Deck 4 mounts a prime mover 8, such as but not limited to, an internal combustion engine or an electric motor. As best shown in FIG. 2, prime mover 8 powers at least one rotary cutting blade 10 contained within a cutting chamber 12 in the underside of deck 4 with cutting chamber 12 being generally open at the bottom. As blade 10 rotates in a substantially horizontal cutting plane, sharpened cutting surfaces on the leading edges of opposite sides of blade 10 sever uncut blades of grass at a height determined by the vertical adjustment of wheels 6 relative to deck 4. Blade 10 typically includes airflow generating sails 14 on the trailing edges of opposite sides of blade 10 to create an airflow in which the grass clippings are entrained.

As further shown in FIG. 2, deck 4 includes a rear discharge opening 16 through which the grass clippings may pass. A pivotal door 18 on deck 4 selectively covers or uncovers rear discharge opening 16. When door 18 is pivoted upwardly on deck 4 to uncover rear discharge opening 16 as shown in FIG. 2, a rear bag (not shown) may be attached to deck 4 adjacent the opening 16 to collect the grass clippings within the bag with the rear bag when installed extending rearwardly into the space between lower portions of handle tubes 28. Alternatively, a side discharge chute (not shown) may be inserted into opening 16 to cause the grass clippings to be thrown laterally to one side of deck 4. As another option, if a mulching plug is inserted into the rear of the tunnel leading to opening 16 and door 18 is pivoted downwardly to cover rear discharge opening 16, the grass clippings will then be mulched by being driven downwardly into the grass through the open bottom of deck 4.

A variable speed traction drive 20 is mounted in deck 4 and selectively powers at least one wheel 6 to self-propel deck 4 over the ground. As shown in FIG. 2, one embodiment of traction drive 20 comprises a transmission 22 mounted on an axle 24 that drives the pair of rear wheels 6r. Transmission 22 may be a mechanical transmission arranged to provide forward rotational movement of rear wheels 6r to self-propel deck 4 in a forward direction. Transmission 22 is belt driven from prime mover 8 and may be selectively rocked to produce a forward ground speed that is infinitely variable from zero ground speed when the belt is slack to a maximum ground speed when the belt is taut. Other variable speed traction drives 20 may be used, e.g. variable speed electric or hydraulic motors, CVT's, and the like.

Mower 2 includes an upwardly and rearwardly extending handle 26 comprising a pair of laterally spaced handle tubes 28 which are joined together by an upper cross member 30. Handle tubes 28 have connections 50 to the rear of deck 4 to permit the inclination of handle 26 relative to deck 4 to be adjusted in a conventional manner to suit the height of the user. Once the angle of inclination is adjusted and locked in, handle tubes 28 incline upwardly as they extend rearwardly from connections 50 to terminate at cross member 30 which unites handle tubes 28. In the embodiment shown herein, handle tubes 28 and cross member 30 are formed of a single piece of tubing material that is suitably bent into the generally U-shaped configuration that is illustrated in the figures. In other embodiments, handle tubes 28 may be split in the middle into upper and lower portions that may be selectively folded on top of one another to reduce the length of handle 26 to facilitate storage of mower 2 when mower 2 is not being used.

Figure 3:
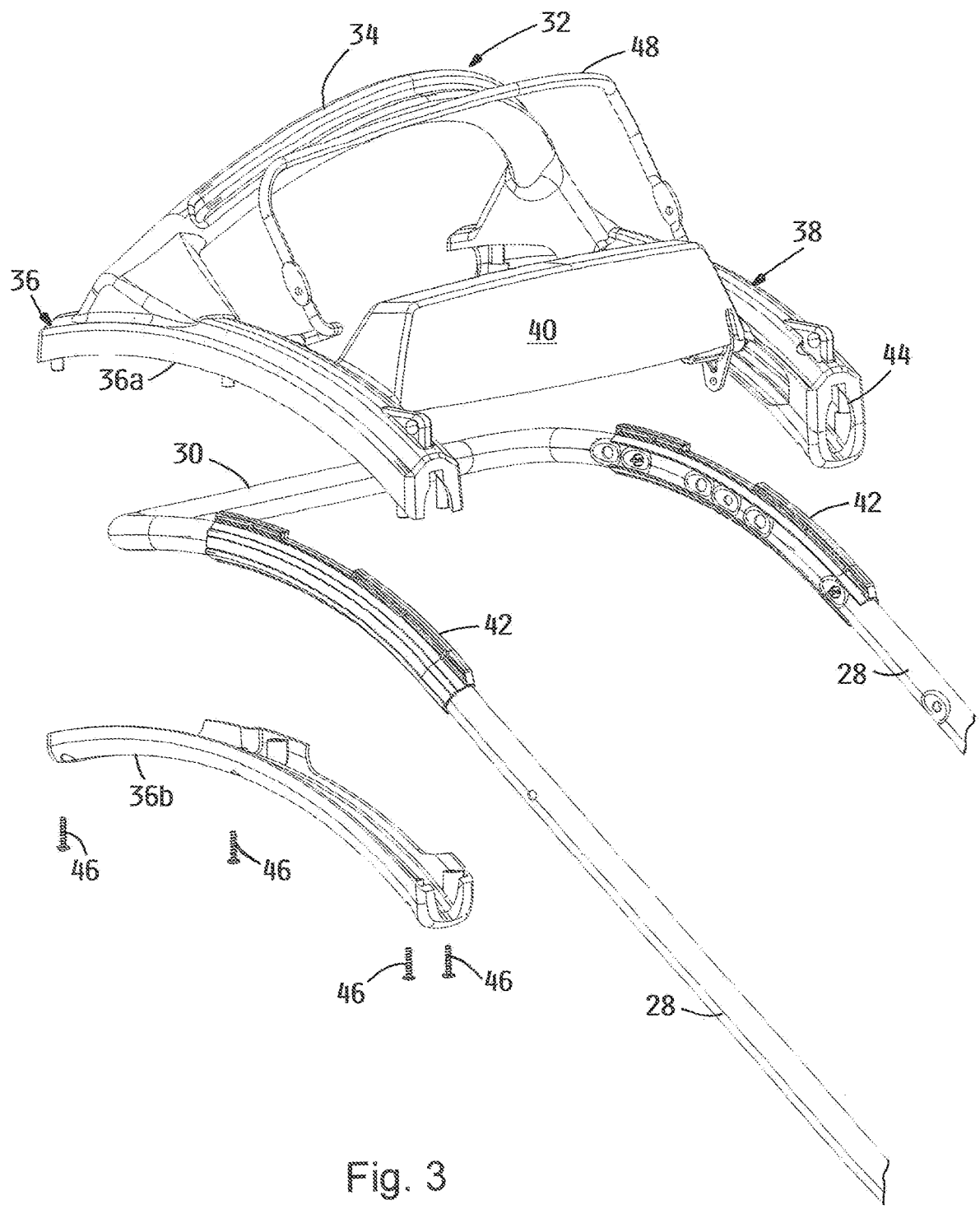
FIG. 3 is a perspective view of a portion of the handle of the mower shown in FIG. 1, particularly illustrating the slidable handle grip of the handle in an exploded form as well as illustrating the blade control bail in an open, blade disengaged position on the slidable handle grip of the handle.

Handle 26 further includes a slidable handle grip 32 that forms the traction drive control operated by the user to vary the ground speed of mower 2. Handle grip 32 is carried on the top of the handle 26 for controlling the operation of traction drive 20 either through one or more actuation cables (not shown) that extend between handle grip 32 and traction drive 20 or through an electronic fly by wire control system. Handle grip 32 has a transverse cross bar 34 that connects the upper ends of two downwardly extending legs 36 and 38 to provide a generally U-shaped handle grip. As best shown in FIG. 3, cross bar 34 extends upwardly from legs 36 and 38 and has a smooth, substantially continuous, downwardly facing curve from one end to the other such that a user is able to grip cross bar 34 with both hands much like the way the user would grip the upper portion of a steering wheel in an automobile. An escutcheon plate 40 positioned forwardly of cross bar 34 also extends between legs 36 and 38 and is used to mount and/or cover various pivotal linkages which link handle grip 32 to the traction drive actuation cable(s).

Legs 36 and 38 are telescopically received on the upper ends of handle tubes 28 for a sliding motion relative thereto. As best shown in FIG. 3, this sliding motion is facilitated by plastic slides 42 fixed to the upper ends of handle tubes 28. Slides 42 reduce friction to provide a smooth sliding motion for handle grip 32. Slides 42 and legs 36 and 38 also have a keyhole slot interface 44 therebetween to maintain alignment of handle grip 32 on handle 26. Legs 36 and 38 may be made in upper and lower halves, shown at 36a and 36b in FIG. 3 with respect to leg 36, which are clamped together by fasteners 46 to facilitate assembly of handle grip 32 around handle tubes 28.

Figure 5:
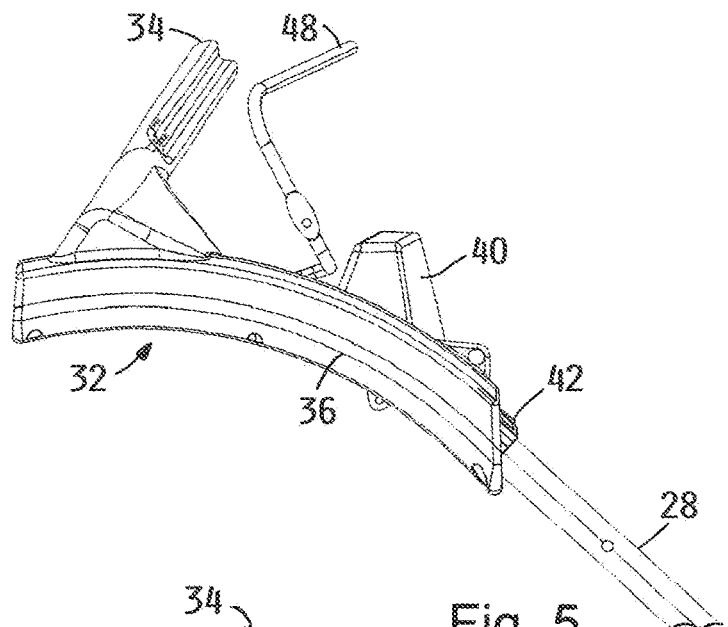
FIG. 5 is a side elevational view of an upper end of the handle of mower of FIG. 1, particularly illustrating the slidable handle grip in a neutral position relative to the handle in which a unidirectional or bidirectional traction drive carried on the mower is disengaged with the result that the mower is not being self-propelled.
Figure 6:
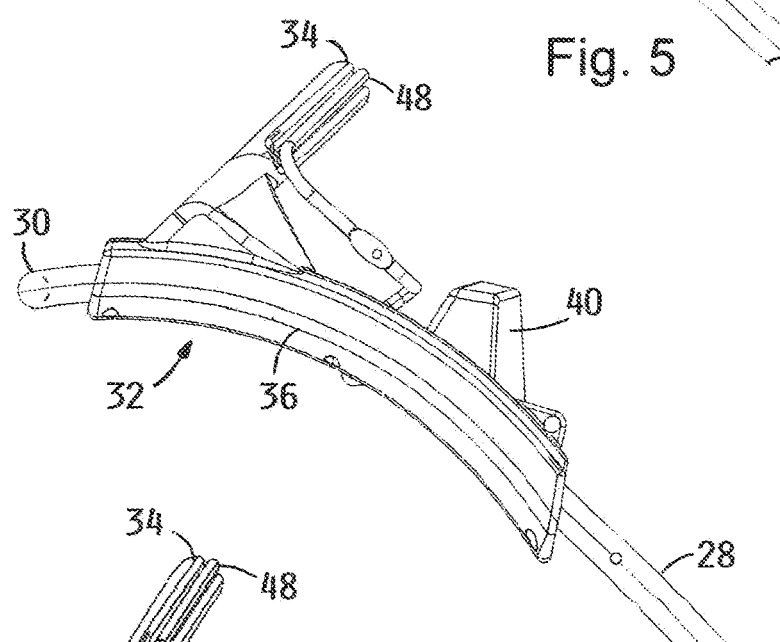
FIG. 6 is a side elevational view similar to FIG. 5, particularly illustrating the slidable handle grip in a fully forward position relative to the handle in which a unidirectional or bidirectional traction drive carried on the mower is engaged for forward motion with the result that the mower is being self-propelled forwardly at a maximum forward speed.
Figure 7:
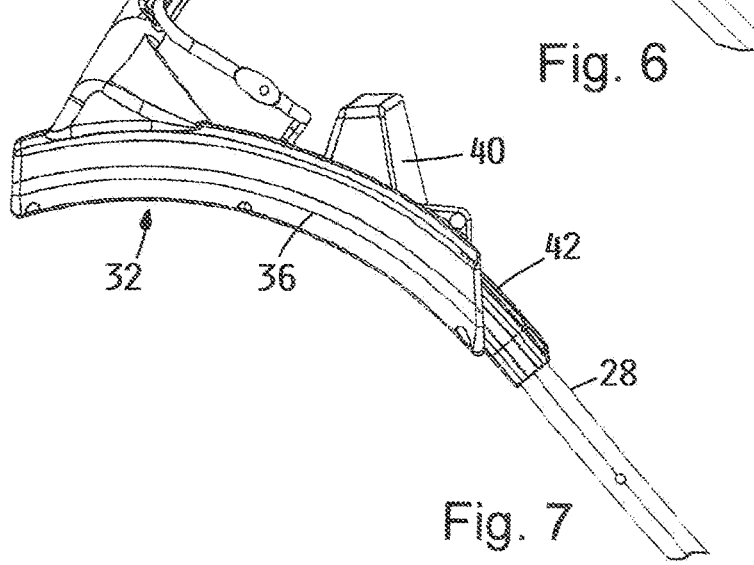
FIG. 7 is a side elevational view similar to FIGS. 5 and 6, particularly illustrating the slidable handle grip in a fully rearward position relative to the handle in which a bidirectional traction drive carried on the mower is engaged for rearward motion with the result that the mower is being self-propelled rearwardly at a maximum rearward speed.

Handle grip 32 also controls the operation of blade 10 through a pivotal blade control bail 48 mounted thereon. Operation of blade 10 is possible only when bail 48 is pivoted from the open, blade disengaged position shown in FIGS. 1, 3 and 5 to a closed position in which bail 48 is held by the user against cross bar 34 of handle grip 32 as shown in FIGS. 6 and 7. When the user releases bail 48 from its closed position against cross bar 34, a spring (not shown) will return bail 48 to its open position in which blade 10 is stopped. In some embodiments, bail 48 when released by the user operates a kill switch (not shown) on prime mover 8 to stop blade 10 by stopping prime mover 8. In other embodiments, prime mover 8 continuously operates after being started while bail 48 when released stops blade 10 by disengaging a blade brake clutch (not shown) connecting prime mover 8 and blade 10.

Additional details of the operation of traction drive 20 and the manner in which handle grip 32 is constructed and operates to control traction drive 20 are set forth in the '083, '229 and '381 patents as incorporated by reference above.

Figure 4:
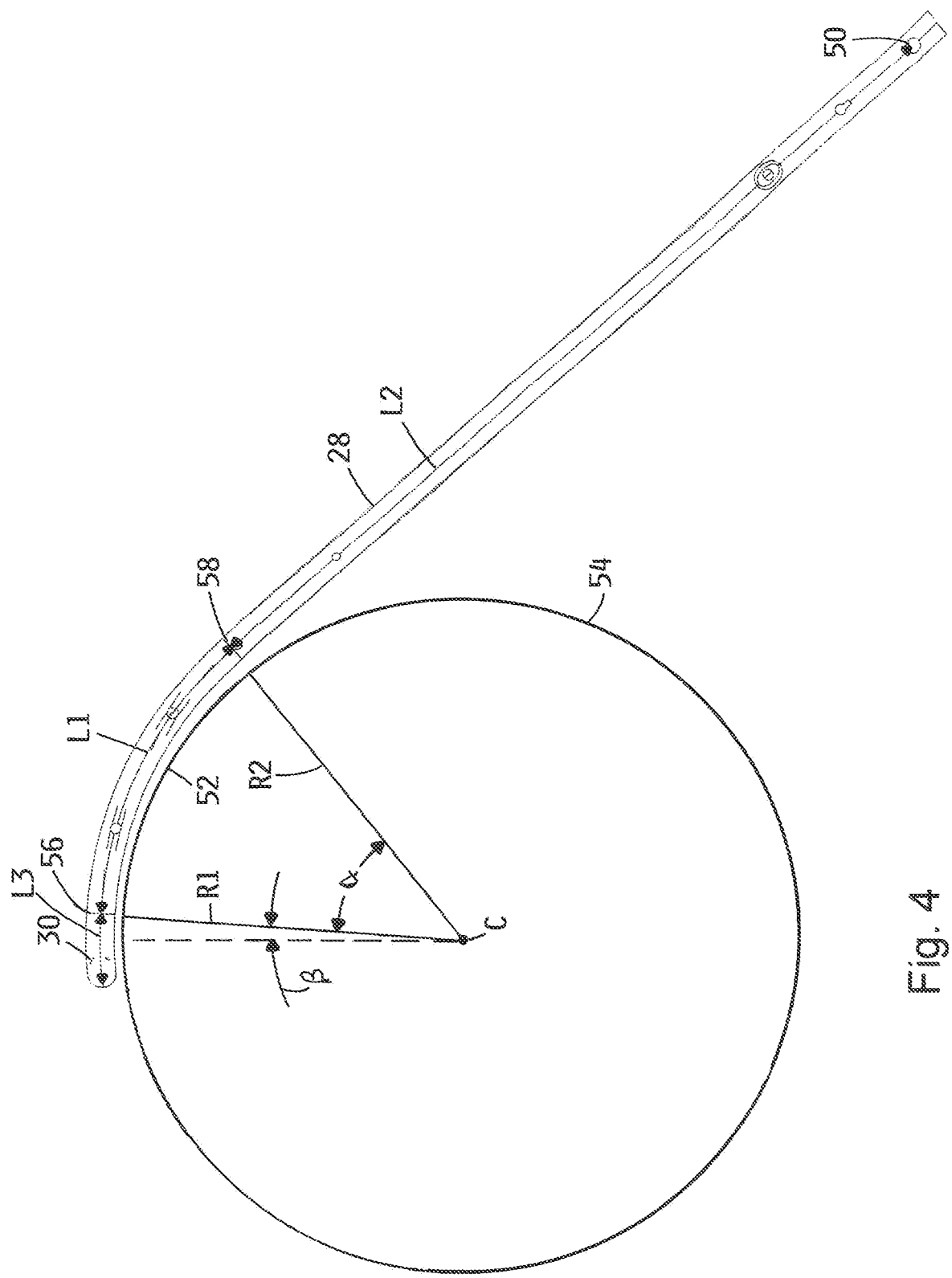
FIG. 4 is a side elevational view of a portion of the handle of the mower of FIG. 1, particularly illustrating the curved portion of the handle at the upper end of the handle.

In this invention, handle grip 32 moves along a curved path as the user selectively slides handle grip 32 on handle tubes 28 to engage traction drive 20 and to vary the speed of traction drive 20 to thereby vary the ground speed of mower 2. Referring now to FIG. 4 and in one embodiment of this invention, the curved path comprises a substantially circular arc 52 defined by a portion of the circumference of an imaginary circle 54 having a center C and a radius R. In FIG. 4, imaginary circle 54 has been projected onto a fore-and-aft extending plane lying adjacent one handle tube 28 to illustrate where circular arc 52 is located in relationship to the entirety of each handle tube 28. Circular arc 52 and circle 54 are shown in FIG. 4 slightly displaced below the actual curved portions of handle tubes 28 for the sake of not obscuring the depicted handle tube 28. In practice, what is labeled in FIG. 4 as circular arc 52 substantially overlies or is coincident with the fore-and-aft centerline of the curved portion of the depicted handle tube 28 without any gap between the two.

Circular arc 52 is positioned at the upper ends of handle tubes 28 substantially immediately forward of cross member 30. Circular arc 52 has a first end 56 which is coaxial with a first radius line R1 of circle 54 and a second end 58 which is coaxial with a second radius line R2 of circle 54. The length of circular arc 52 between radius lines R1 and R2 has been depicted in FIG. 4 as L1.

As shown in FIG. 4, handle tubes 28 preferably extend in a straight line downwardly away from second end 58 of circular arc 52 over a length L2 measured from second end 58 of circular arc 52 to connections 50 which secure handle tubes 28 to deck 3. FIG. 4 is plotted to scale. By measuring the lengths L1 and L2 in FIG. 4, L1 comprises approximately 25% (i.e., 23.65%) of the sum of L1 and L2 although L1 could be in the range of from approximately 20% to approximately 30% of the sum of L1 and L2. Cross member 30 and the bends which join cross member 30 to first end 56 of circular arc add but a very short additional length L3 to L1 and L2. L3 comprises approximately 5% of the sum of L1 and L2.

Referring still to FIG. 4, an angle $\alpha$ of approximately 45° is subtended by circular arc 52. However, a small angle $\beta$ of approximately 5° separates angle $\alpha$ from the very top of circle 54. Accordingly, if the top of circle 54 is assigned a value of 0° and going clockwise around circle 54, angle $\beta$ extends from approximately 0° to approximately 5° and angle $\alpha$ extends from approximately 5° to approximately 50°.

Applicants have discovered that a radius R of approximately 12 inches for circle 54 positioned substantially as shown in FIG. 4 works well for the purposes of this invention as will be described hereafter. Radius R should preferably be in the range of from approximately 10 to approximately 14 inches. With a radius in this range, the top of imaginary circle 54 will have a vertical elevation approximately at or slightly below the upper ends of handle tubes 54 while the bottom of imaginary circle 54 will have a vertical elevation approximately at or above connections 50 at the lower ends of handle tubes 28. In effect, imaginary circle 54 is not so large as to extend above handle tubes 28 or below connections 50.

The use of an arcuate curve as described above provides slidable handle grip 32 with a much flatter and a generally horizontal travel that has been found to be more ergonomic and user friendly than the prior art slidable handle grips used in Personal Pace® mowers. This is depicted in FIGS. 5-7. As a preliminary matter, it should be noted that legs 36 and 28 of handle grip are obviously sized and curved to mate with and slide along circular arcs 52 on handle tubes 28. This is apparent from the curved orientation of legs 36 and 28 in FIGS. 1-3 and 5-7 of this application.

FIG. 5 depicts slidable handle grip 32 in a neutral position thereof. Handle grip 32 is spring biased into this position when the user is not applying any force to cross bar 34 of handle grip 32 as is well known in Personal Pace® mowers. In this position, traction drive 20 is not engaged and mower 2 is correspondingly not being self-propelled. As can be seen in FIG. 5, curved legs 36 and 38 are mated with circular arcs 52 on handle tubes 28 with slidable handle grip 32 being at the very top of handle tubes 28. In this position, legs 36 and 38 enclose most or all of the length of circular arcs 52. Only a small portion of slides 42 on handle tubes 28 is visible in FIG. 5 poking out of the bottom of legs 36 and 38.

To engage traction drive 20 and self-propel mower 2 forwardly, the user need only grip cross bar 32 of handle grip 32 and walk forwardly at whatever pace the user desires. This will cause handle grip 32 to slide downwardly on circular arcs 52 a distance that is generally proportional to how fast the user walks forwardly. Thus, the ground speed of the mower generally matches the walking pace of the mower in a seamless and effortless manner. This is a characteristic of all Personal Pace® mowers.

FIG. 6 depicts slidable handle grip 32 in its fully forward position where traction drive 20 is propelling mower 2 forwardly at a maximum forward ground speed. In this position, legs 36 and 38 have moved forwardly along handle tubes 28 and now fully cover all of slides 42. However, due to the arcuate path between handle tubes 28 and legs 36 and 38 of handle grip 32 as provided by circular arcs 52, cross bar 34 has moved more horizontally than what would have been the case if circular arcs 52 had been absent and handle tubes 28 had been linear over their entire length as in prior art Personal Pace® mowers. This flattening of the path of travel of handle grip 32, and particularly the flattening in the path of travel of the rearwardly located portion of handle grip 32 the user holds onto, i.e. cross bar 34, provides an improved, more natural feel to a user who is operating mower 2.

FIGS. 5 and 6 depict the path of travel of handle grip 32 in a mower 2 having a unidirectional traction drive 20 that self-propels mower 2 in a forward only direction. In such a mower, if the user pulls rearwardly on handle grip 32 in its neutral position, the force applied to handle grip 32 is the force that pulls mower 2 rearwardly since traction drive 20 remains disengaged. In such reverse motion, drive wheels 4r would free-wheel as axle 24 would type have one-way clutches at either end connecting drive wheels 4r to axle 24. Such well known one way clutches would release when the user pulls mower 3 rearwardly so that the load from transmission 20 would be removed from drive wheels 4r during such reverse motion.

However, as noted earlier, traction drive 20 could also be supplied in a bidirectional form to allow powered, self-propulsion of mower 2 in both forward and reverse. In this case, slidable handle grip 32 slides rearwardly along circular arc 52 from the neutral position shown in FIG. 4. The amount of rearward sliding is again dependent upon the degree of force applied to handle grip 32 by the user as the user walks rearwardly. With a bi-directional traction drive 20, the user no longer needs to manually pull mower 2 to the rear since traction drive 20 is propelling mower 2 to the rear at a speed that is determined by how far handle grip 32 has been slid rearwardly relative to the neutral position.

FIG. 7 shows handle grip 32 in its most rearward position corresponding to the maximum reverse ground speed of mower 2. In this position, much more of slides 42 on handle tubes 28 are now uncovered since legs 36 and 38 have moved upwardly along circular arcs 52 on handle tubes 28. However, the motion of handle grip 32 in reverse, and particularly the amount of rise of cross bar 34 which the user is gripping, is significantly smaller than the amount of drop of cross bar 34 in forward. This is due to the fact that circular arc 52 is offset from the top of circle 54 by the small angle β shown in FIG. 4. Thus, as handle grip 52 moves rearwardly from neutral, handle grip 32 lifts slightly in a first portion of its travel until it has moved reversely through angle β and then handle grip 32 moves substantially horizontally or drops very slightly in a second portion of its travel. As can be seen by comparing FIG. 7 to FIG. 5, handle grip 32 ends up in a vertical position at maximum reverse speed that is substantially the same as what handle grip 32 had in the neutral position.

Figure 8:
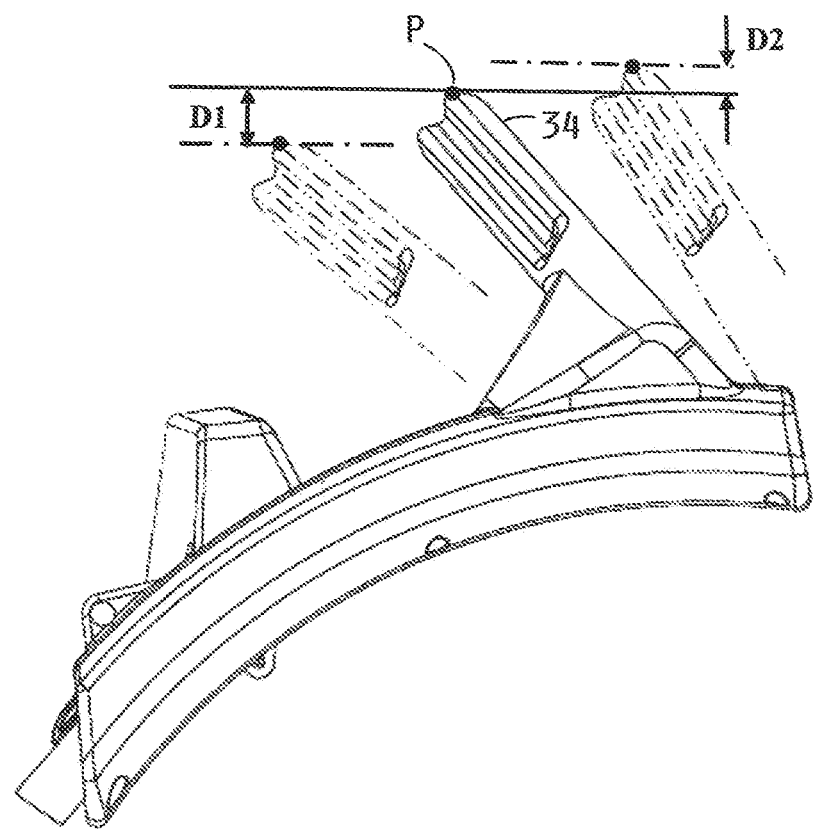
FIG. 8 is a side elevational view of a portion of the handle of the mower of FIG. 1, particularly illustrating the drop D1 in the slidable handle grip relative to the neutral position thereof as the handle grip is pushed downwardly in a mower with a bidirectional traction drive system to its most forward position to propel the mower at a maximum forward ground speed and further illustrating the rise D2 in the slidable handle grip relative to the neutral position as the handle grip is pulled rearwardly to its most rearward position to propel the mower at a maximum reverse ground speed.

FIG. 8 is an illustration depicting the amount of drop D1 of a reference point P on cross bar 34 relative to neutral when handle grip 32 has been pushed downwardly out of neutral to its most forward position corresponding to maximum forward ground speed of mower 2. Similarly, FIG. 8 depicts the amount of rise D2 of the same reference point P on cross bar 34 relative to neutral when handle grip 32 has been pulled rearwardly out of neutral to its most rearward position corresponding to the maximum reverse ground speed of mower 2. In one embodiment of mower 2, D1 is equal to approximately 0.824 inches and D2 is equal to approximately 0.407 inches. D2 is approximately 50% of D1 but mower 2 could be designed such that D2 is even a smaller percentage of D1 than approximately 50%. By contrast, in prior art Personal Pace® mowers of the Applicant in which the corresponding handle grip 32 rides on linear handle tubes without a curve therein, D1 and D2 are approximately the same as one another with D1 comprising 0.993 inches and D2 comprising 0.899 inches.

For all intents and purposes, the slight rise in handle grip 32 of a little more than three eighths of an inch when moving from the neutral position of FIG. 5 to the maximum reverse speed position of FIG. 7 will be generally undetectable to most users. Most users will perceive slidable handle grip 32 as having moved substantially linearly to the rear at a substantially constant vertical height when the user is pulling back on handle grip 32 to self-propel mower 2 rearwardly. As a result, the tendency of the user to unwittingly push down on handle grip 32 during reverse motion thereof and thus unwittingly raise front wheels 6f off the ground will be substantially lessened. In addition, the ergonomic and natural feel imparted by the substantially horizontal motion of handle grip 32 when it is being pulled rearwardly will provide an enhanced experience to an operator of mower 2.

Various other modifications of this invention will be apparent to those skilled in the art. Accordingly, the scope of this invention is to be limited only by the appended claims.

The invention claimed is:

1. A walk power mower, which comprises:
   (a) a deck having at least one rotary blade for cutting grass, the deck having a self-propel system to provide the deck with powered movement over the ground at a variable ground speed; and
   (b) a handle extending from the deck to allow an operator to walk behind the deck and hold the handle and thereby guide the deck during its movement over the ground, the handle including a handle grip that slides up and down on the handle to control the ground speed of the deck, wherein the slidable handle grip of the handle follows a curved path as it slides up and down on the handle.

2. The mower of claim 1, wherein the curved path is located at an upper end of the handle between a preceding lower portion of the handle which does not lie on the curved path and a following rear end of the handle which does not lie on the curved path.

3. The mower of claim 2, wherein the preceding lower portion of the handle is substantially longer than the curved path and the following rear end of the handle is substantially shorter than the curved path.

4. The mower of claim 3, wherein the curved path comprises a circular arc extending along a portion of a circumference of an imaginary circle projected onto a fore-and-aft extending vertical plane lying adjacent the handle.

5. The mower of claim 1, wherein the curved path comprises a circular arc extending along a portion of a circumference of an imaginary circle projected onto a fore-and-aft extending vertical plane lying adjacent the handle.

6. The mower of claim 5, wherein the circular arc subtends an angle α of approximately 45°.

7. The mower of claim 6, wherein the angle α is displaced forwardly of a top of the imaginary circle by an angle β of approximately 5°.

8. The mower of claim 5, wherein the circular arc subtends an angle α which is displaced forwardly of a top of the imaginary circle by an angle β that is substantially smaller than the angle α.

9. The mower of claim 5, wherein the handle extends upwardly and rearwardly from a connection of a front end of the handle to the deck to an upper rear end of the handle which is higher than the connection, and wherein the imaginary circle is vertically contained between the connection of the front end of the handle to the deck and the upper rear end of the handle.

10. The mower of claim 9, wherein the circular arc has a predetermined length L1 and the handle has a predetermined length L2 between the connection of the front end of the handle to the deck and a beginning of the circular arc, and wherein L1 is approximately 20% to approximately 30% of the sum of L1 and L2.

11. The mower of claim 5, wherein the circular arc has a radius of at least approximately 10 inches.

12. The mower of claim 11, wherein the circular arc has a radius in the range of approximately 10 inches to approximately 14 inches.

13. The mower of claim 12, wherein the circular arc has a radius of approximately 12 inches.

14. A walk power mower, which comprises:
(a) a deck having at least one rotary blade for cutting grass, the deck having a self-propel system to provide the deck with powered movement over the ground at a variable ground speed; and
(b) a handle extending upwardly and rearwardly from the deck to allow an operator to walk behind the deck and hold the handle and thereby guide the deck during its movement over the ground, the handle comprising:
(i) a pair of laterally spaced handle tubes connected at lower ends thereof to the deck, the handle tubes being joined to one another at upper ends thereof by a laterally extending cross member, the handle tubes having curved upper portions located between lower portions of the handle tubes and the cross member; and
(ii) a handle grip having a pair of laterally spaced, curved legs telescopically connected to the curved upper portions of the handle tubes to permit the curved legs of the handle grip to slide up and down on the curved upper portions of the handle tubes to control the ground speed of the deck.

15. The mower of claim 14, wherein the handle grip further includes a laterally extending cross bar which connects upper ends of the legs together, the cross bar being long enough to allow a user to grip the cross bar with both hands.

16. The mower of claim 15, wherein the cross bar has a downwardly facing and substantially continuous curve extending laterally between and positioned above the legs.

17. The mower of claim 14, wherein the lower portions of the handle tubes are straight and are substantially longer than the curved upper portions of the handle tubes.

18. The mower of claim 14, wherein the handle grip has a neutral position in which a unidirectional or bidirectional self-propel system is disengaged, the handle grip in the neutral position having rear ends of the legs thereof substantially in alignment in a fore-and-aft direction with the cross member of the handle tubes.

19. The mower of claim 18, wherein the handle grip has a fully forward position in which the unidirectional or bidirectional self-propel system is engaged and is powering the deck forwardly at a maximum forward ground speed, the handle grip in the fully forward position having the rear ends of the legs displaced in the fore-and-aft direction forwardly of the cross member of the handle tubes.

20. The mower of claim 19, wherein the handle grip has a fully rearward position in which the bidirectional self-propel system is engaged and is powering the deck rearwardly at a maximum reverse ground speed, the handle grip in the fully rearward position having the rear ends of the legs displaced in the fore-and-aft direction rearwardly of the cross member of the handle tubes.

21. A walk power mower, which comprises:
(a) a deck having at least one rotary blade for cutting grass, the deck having a bidirectional self-propel system to provide the deck with powered forward and reverse movement over the ground at a variable ground speed;
(b) a handle extending from the deck to allow an operator to walk behind the deck and hold the handle and thereby guide the deck during its movement over the ground, the handle including a handle grip that slides up and down on the handle to control the ground speed of the deck, wherein the slidable handle grip of the handle follows a curved path as it slides up and down on the handle; and
(c) wherein the handle grip has a neutral position in which the self-propel system is disengaged, a fully forward position in which the handle grip has been pushed downwardly from the neutral position to propel the deck forwardly at a maximum forward ground speed, a fully rearward position in which the handle grip has been pulled rearwardly from the neutral position to propel the deck rearwardly a maximum rearward ground speed, and wherein the handle grip in the fully rearward position has risen relative to the neutral position by a distance D2 which is approximately 50% or less than a distance D1 corresponding to how far the handle grip in the fully forward position has dropped relative to the neutral position.

\* \* \* \* \*